(12) United States Patent
Gandelheidt

(10) Patent No.: US 6,769,684 B2
(45) Date of Patent: Aug. 3, 2004

(54) AIR TURNING BAR

(75) Inventor: Edgar Gandelheidt, Worms (DE)

(73) Assignee: Paul Kiefel Extrusion GmbH, Worms (DE)

( * ) Notice: Subject to any disclaimer, the term of this patent is extended or adjusted under 35 U.S.C. 154(b) by 110 days.

(21) Appl. No.: 10/106,957

(22) Filed: Mar. 26, 2002

(65) Prior Publication Data

US 2002/0142064 A1 Oct. 3, 2002

(30) Foreign Application Priority Data

Mar. 28, 2001 (DE) .......................................... 101 15 259

(51) Int. Cl.⁷ ................................................ B65H 5/22
(52) U.S. Cl. ................... 271/276; 425/72.1; 425/326.1; 425/377
(58) Field of Search ........................ 271/276; 425/72.1, 425/366.1, 377, 387.1, 392

(56) References Cited

U.S. PATENT DOCUMENTS

| 3,492,693 A | 2/1970 | Clarke et al. |
| 5,674,540 A | 10/1997 | Sensen et al. |
| 6,398,534 B1 | 6/2002 | Faehling et al. |

FOREIGN PATENT DOCUMENTS

| DE | 44 40 647 C2 | 5/1996 |
| EP | 0 992 334 A2 | 4/2000 |

Primary Examiner—Donald P. Walsh
Assistant Examiner—Kaitlin Joerger
(74) Attorney, Agent, or Firm—Cohen, Pontani, Lieberman & Pavane

(57) ABSTRACT

An air turning bar for a take-off device for plastic films has a hollow cylindrical body having a depression in the region of the bar around which the film is wrapped. The remaining region of the bar is circular cylindrical. Air outlet openings are provided within the depression. Narrow circular cylindrical strips adjoin the ends of the depression which are provided in the longitudinal direction of the air turning bar.

10 Claims, 2 Drawing Sheets

AIR TURNING BAR

BACKGROUND OF THE INVENTION

1. Field of the Invention

The invention relates to an air turning bar for a take-off device for plastic films, in which air outlet openings are provided in that region of its circumferential surface around which the plastic film is wrapped during its transportation.

2. Description of the Prior Art

In the case of an air turning bar which is disclosed in EP 0 992 334 A2, in order to produce an air cushion in the wrapping region of the plastic film, the said air turning bar is bent over its entire length and is set in such a manner that the concave side is situated essentially at the vertex of the deflection. This produces a relatively large cavity between the film and the air turning bar, a lot of compressed air being required in order to fill the said cavity. Furthermore, the bending of the air turning bar means that the side borders of the film have only a relatively small border region which is suitable for sealing the air cushion. Furthermore, it is difficult to produce uniform bending of the air turning bar. Finally, the bending of the air turning bar means that, during an adjustment in the circumferential direction, problems may occur in an undesirable manner because of contact between the film and the air turning bar.

SUMMARY OF THE INVENTION

The object of the invention is to provide an air turning bar, in which an air cushion region which can be delimited precisely can be provided without the disadvantages of a bent air turning bar in terms of its production and its limitations having to be accepted during an adjustment in the circumferential direction.

This object is achieved according to the invention in the case of an air turning bar of the type mentioned at the beginning in that the air turning bar has, at least in one part of the wrapping region, a depression with respect to the remaining circular cylindrical circumference.

A depression in the air turning bar can be adapted to the particular requirements without a deviation from the circular cylindrical shape of the air turning bar being present in the remaining region, which deviation could initiate possible disturbances with regard to the surrounding plastic film. Furthermore, the insertion of a depression can be brought about more simply than the bending of an entire bar, and, specifically, in a predetermined, exact shape. The depression enables the air cushion space to be designed in accordance with the requirements, which is not possible to this extent with bending of the air turning bar, because the air cushion space has inevitable, different dimensions in thickness along the air turning bar due to the bending. The depression can be adapted in its shape and depth to the particular conditions without the remaining circumference of the air turning bar being influenced.

In a development of the invention, the depression can be produced by pressing in a hollow air turning bar, or there is also the possibility of producing the depression by a recess.

A further, advantageous refinement of the invention consists in the air turning bar having, at the ends of the depression, as seen in the longitudinal direction of the air turning bar, a respective strip having a circular cylindrical circumference. In contrast to a bent air turning bar, this enables a relatively great resistance to be set in the border region against air flowing off in the longitudinal direction of the air turning bar and therefore enables leakage losses to be reduced. Depending on the requirements present in each case, the depression may have, at its border, a rounded transitional region to the circular cylindrical region or the depression may be bounded at its border by a sharp edge. These design possibilities are not provided in the case of an air turning bar bent in its entirety.

The depression may have at least one row of air outlet openings orientated in the longitudinal direction of the depression or a plurality of air outlet openings may be distributed over the surface of the depression, which can depend on the shape of the depression, the size of the air outlet openings, the width of the plastic film to be taken off, etc.

If, in a development of the invention, the air turning bar can be rotated and secured in the circumferential direction, then the position of the depression with respect to the plastic film, and therefore the influence of the air cushion on the plastic film, can be changed.

BRIEF DESCRIPTION OF THE DRAWINGS

The invention will be explained in greater detail below with reference to an exemplary embodiment. In the drawings.

DETAILED DESCRIPTION OF THE PREFERRED EMBODIMENT

Figure 3:
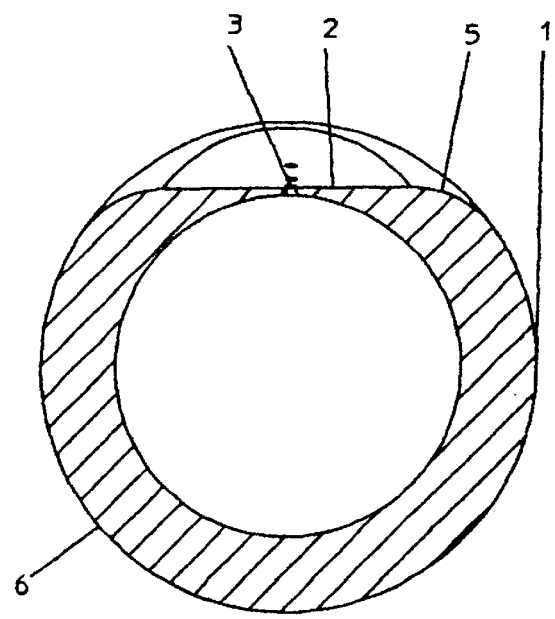
FIG. 3 is a section taken along the line III—III in FIG. 1.
Figure 1:
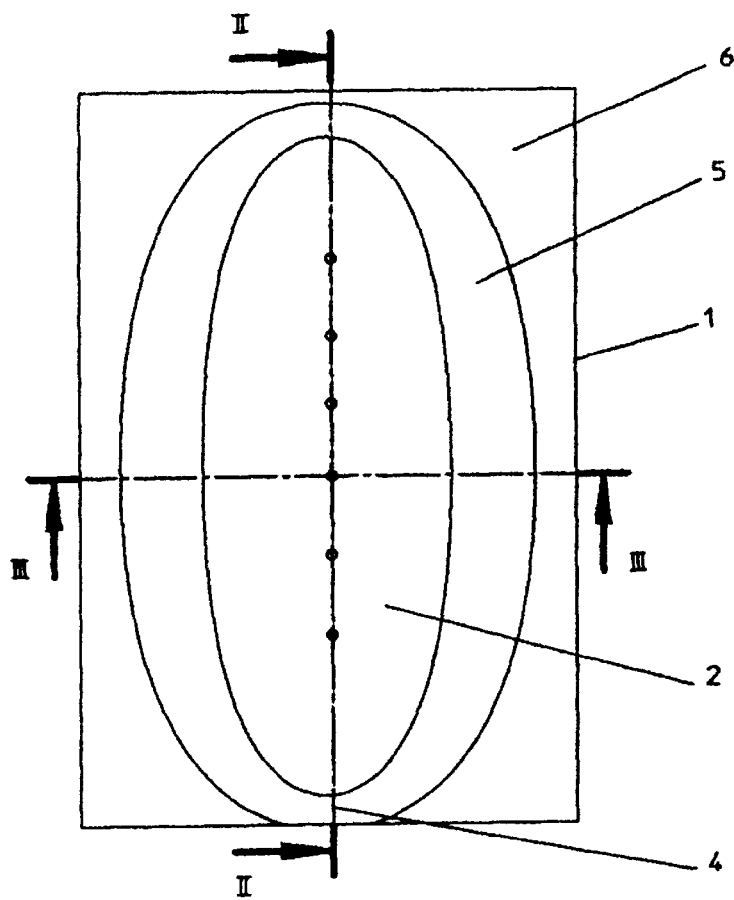
FIG. 1 is a plan view of an air turning bar according to an embodiment of the present invention.
Figure 4:
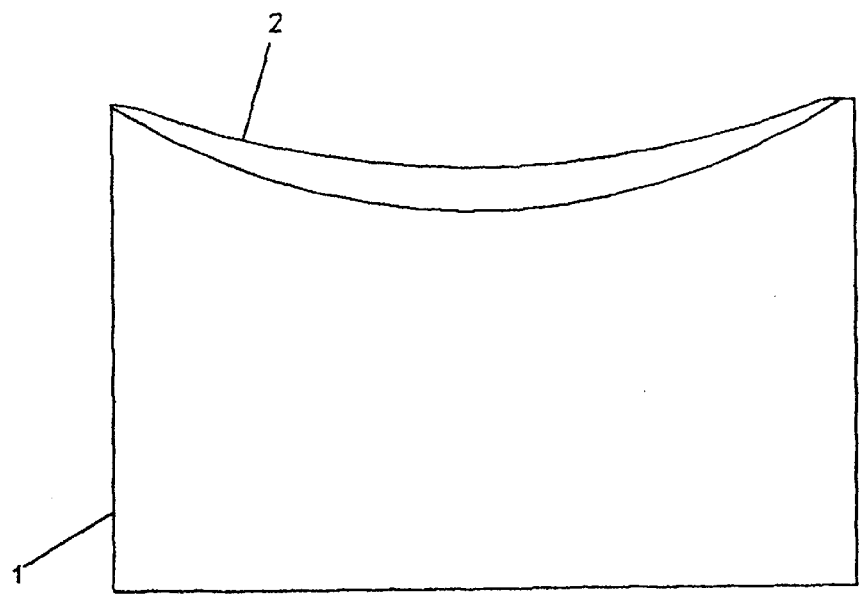
FIG. 4 is a side view of the turning bar of FIG. 1.
Figure 2:
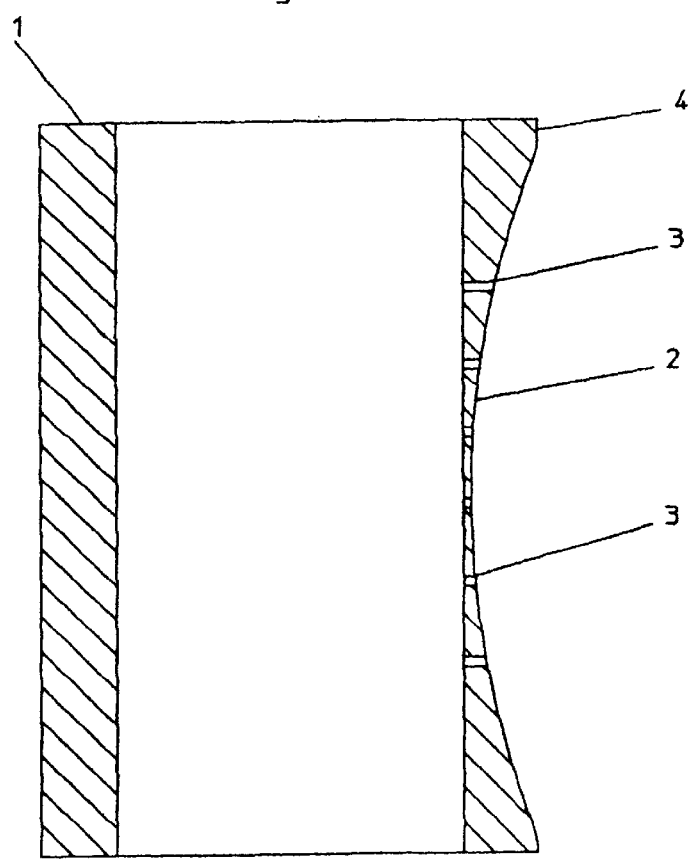
FIG. 2 is a section taken along the line II—II in FIG. 1.

As can be seen from the graphical illustrations of FIGS. 1–4, an air turning bar 1 has a cylindrical hollow body which has a depression 2 in a certain region, which forms the wrapping region for a plastic film (not illustrated) to be transported. The depression 2 as seen in the longitudinal direction of the air turning bar 1, has a row of air outlet openings 3 which produce an air cushion in the region of this depression 2 in order to avoid the plastic film which is to be transported bearing against the air turning bar. At each end of the depression 2 there remains, as seen in the longitudinal direction, a narrow region which is denoted by 4 and which has the customary, circular cylindrical cross section of the air turning bar and which ensures a reduction in leakage losses. A transitional region, which is denoted by 5, from the depression to the circular cylindrical circumference 6 is denoted by 5 and has a rounded design in the exemplary embodiment illustrated.

What is claimed is:

1. An air turning bar for a take-off device for the transport of plastic film therearound, comprising a bar having a circular cylindrical circumferential surface and a region of said circumferential surface around which the plastic film is wrapped during the transport thereof, said bar defining air outlet openings which open in the region of said circumferential surface around which the plastic film is wrapped, and said bar further defining a depression formed in the region of the circular cylindrical circumferential surface around which the plastic film is wrapped relative to a remaining circular cylindrical circumference of said bar.

2. The air turning bar of claim 1, wherein said bar comprises a hollow bar and said depression comprises a pressed-in section of said hollow bar.

3. The air turning bar of claim 1, wherein said depression comprises a recess formed in said circular cylindrical circumferential surface.

4. The air turning bar of claim 1, wherein said bar comprises a longitudinal axis and said bar comprises sections at both longitudinal ends of the depression having circular cylindrical circumferences.

5. The air turning bar of claim 1, wherein said bar further defines a rounded transitional region between said depression and said circular cylindrical circumferential surface.

6. The air turning bar of claim 1, wherein said bar further defines a sharp edge between said depression and said circular cylindrical circumferential surface.

7. The air turning bar of claim 1, wherein said depression comprises a longitudinal axis and at least portion of said air outlet openings are arranged in row along said longitudinal axis of said depression.

8. The air turning bar of claim 7, wherein said air outlet openings are distributed within a surface of the depression.

9. The air turning bar of claim 1, wherein said air outlet openings are distributed within a surface of the depression.

10. The air turning bar of claim 1, wherein said bar is rotatable for directing the region of said circumferential surface around which the plastic film is wrapped.

\* \* \* \* \*